United States Patent

[11] 3,585,468

| [72] | Inventors | Sidney L. Chertok<br>Pittsfield;<br>David B. Peck, Williamstown, both of, Mass. |
|---|---|---|
| [21] | Appl. No. | 779,414 |
| [22] | Filed | Nov. 27, 1968 |
| [45] | Patented | June 15, 1971 |
| [73] | Assignee | Spraque Electric Company<br>North Adams, Mass. |

[54] THERMOPLASTIC JACKETED THERMOPLASTIC CAPACITOR
6 Claims, 1 Drawing Fig.

[52] U.S. Cl. .............................................. 317/260,
317/230
[51] Int. Cl. .............................................. H01g 3/17
[50] Field of Search .............................................. 317/230,
231, 233, 258, 260

[56] References Cited
UNITED STATES PATENTS

| 2,816,273 | 12/1957 | Peck ............................ | 317/230 |
| 2,935,668 | 5/1960 | Robinson et al. ............. | 317/260 |
| 3,237,274 | 3/1966 | Kalina .......................... | 317/260 |
| 3,319,141 | 5/1967 | Cariou et al. ................. | 317/260 |
| 3,371,295 | 2/1968 | Bourgault et al. ............ | 317/231 |
| 3,436,610 | 4/1969 | Sparrow et al. .............. | 317/230 |

*Primary Examiner*—James D. Kallam
*Attorneys*—Connolly and Hutz, Vincent H. Sweeney, James Paul O'Sullivan and David R. Thornton

ABSTRACT: A capacitor section has convolutely wound metal electrodes separated by at least one film of a polyolefin dielectric material. The volume ratio of polyolefin to metal electrode is at least 3:2. Electrode leads are in contact with the electrodes. An encapsulating jacket surrounds and is thermally bonded to said section. The jacket is of the same species as that of the dielectric film.

PATENTED JUN 15 1971  3,585,468
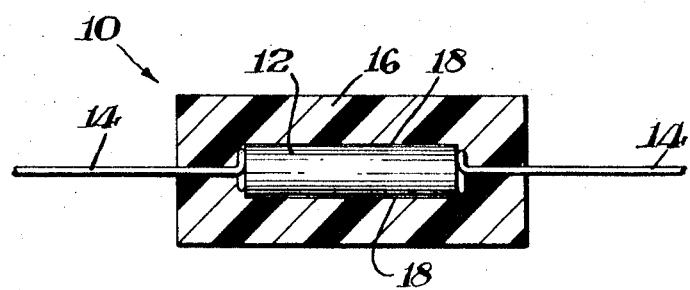

THERMOPLASTIC JACKETED THERMOPLASTIC CAPACITOR

BACKGROUND OF THE INVENTION

This invention is concerned with an electrostatic capacitor having a molded jacket of the same thermoplastic dielectric material as the dielectric spacer.

It is common knowledge in the art that thermoplastic hydrocarbon films make excellent dielectrics for capacitors. A problem exists, however, concerning how to appropriately encapsulate or protect this kind of a capacitor from certain environmental conditions. The use of thermosetting resins as the encapsulating material has not proved successful. These materials as a class have a significantly different thermal coefficient of expansion than that of thermoplastic films and this causes mechanical strain and drift in capacity in the few instances where the molding and curing conditions do not exceed the melting point of the thermoplastic dielectric film. Dipping type resins, such as liquid epoxies, may be applied without exceeding the softening temperature of the dielectric resin, but these also suffer the same defect of having a significantly different thermal coefficient of expansion with deleterious results on the temperature coefficient and capacitance drift. In addition, thermoset materials contain a significant amount of ionic impurities which can, during use of the capacitor, migrate to the electrode regions of the capacitor and create paths of high conductivity leading to eventual breakdown of the capacitor.

It is an object of the invention to overcome the above-mentioned problems.

It is another object of the invention to present a capacitor unit wherein the dielectric film and the jacketing material have the same physical and electrical characteristics.

These and other objects of the invention will become apparent from the following disclosure and claims.

SUMMARY OF THE INVENTION

The present invention is concerned with an encapsulated electrical capacitor having a capacitor section which comprises convolutely wound electrodes separated by at least one film of a thermoplastic polyolefin dielectric material. The dielectric film extends for at least one turn beyond the electrodes. Electrode leads are contacted with the electrodes in any convenient manner. An encapsulating jacket surrounds and is thermally bonded to the section via the dielectric film extension. The jacket is of the same species as that of the dielectric film of the capacitor.

BRIEF DESCRIPTION OF THE DRAWING

The FIGURE of the drawing shows in section an encapsulated capacitor of the present invention.

In the drawing a capacitor 10 comprises a convolutely wound capacitor section 12 having leads 14 in contact with the cooperating electrodes of the capacitor. An encapsulating thermoplastic material 16 surrounds the capacitor and the contacting ends of the leads. The thermoplastic material 16 is thermally bonded at 18 to the outer dielectric winding of the section. The number 18 represents all of the periphery of the section.

DETAILED DESCRIPTION OF THE INVENTION

Example

A convolutely wound capacitor is prepared as follows: Two ¼ mil aluminum foils are separated from one another by two ½ mil biaxially oriented polypropylene dielectric films. The unit is wound in a conventional extended foil, convolute fashion and at the completion of the winding of the capacitor, the polypropylene film is extended about the capacitor section for a distance of about four turns. The capacitor is then subjected to a temperature of approximately 105° C. for a period of about 1 hour in order to heat shrink the dielectric so as to eliminate any air voids or pockets which may have been wound into the capacitor. Axial leads are then welded to the extended foils at each end of the capacitor section. A premolded half-jacket is inserted into one-half of an injection mold die. The half-jacket is made from a commercial polypropylene injection molding composition. The half-jacket generally conforms to the configuration defined by one-half of the convolutely wound capacitor. The capacitor is then cradled in the half-jacket and the top half of the injection mold die, which is identical to the lower half, is placed over the cradled capacitor. A polypropylene injection molding composition of exactly the same material as the half-jacket is injection molded about the capacitor so that an integral composite of the half-jacket and the injected polypropylene mass encapsulates the capacitor. In addition the hot but rapidly cooling injected mass of polypropylene becomes thermally bonded to the outer wrapping of the polypropylene dielectric film.

Because the dielectric spacing material and the encapsulation polymer are of the same species, that is polypropylene, there is no difference in thermal coefficient of expansion and thus no mechanical strain exists or can develop between these two materials. Moreover, the capacitor exhibits no drift in capacitance with change in temperature. While the specific example has employed biaxially oriented polypropylene it will be understood that either unoriented polyolefin dielectric film or monoaxially oriented polyolefin film may be employed.

The term polyolefin is used in its conventional generic sense as including thermoplastic polymers of the monomer species ethylene, propylene, butylene, etc.

The difference in thermal expansion of the electrode film and the dielectric film can be decreased to a considerable extent by employing metallized dielectric films. For example, metallized polypropylene, polyethylene, etc. can be used in the formation of the capacitor. With the use of such a material there will be no significant thermal stressing of the unit. The deposited metal will customarily be aluminum or zinc in a thickness between about 100 and 500 Angstroms and preferably 250 A. For all practical purposes, the difference in thermal expansion between electrodes of this thickness and dielectric films ranging from 0.1—1 mil can be ignored.

When employing a metal foil, aluminum, tin, lead or alloys predominating in these metals are contemplated. The foil thickness will normally range from 0.17—0.5 mils. In all cases, whether a metallized film or a foil is employed, the volume ratio of dielectric spacer to electrode metal must be at least 3:2. In other words, the volume percentage of the electrode material must always be less than about 40 percent of the capacitor section, i.e. electrode plus dielectric spacer film. If the electrode material exceeds this percentage, thermal and geometric instability will be built into the unit with consequent deleterious effects on the temperature coefficient of capacitance and drift of the capacitor.

As indicated the encapsulating jacket is to be of the same species as that of the dielectric film. As illustrated in the Example if the dielectric film is polypropylene the encapsulating jacket should be polypropylene. While the two materials must be of the same species, it is to be understood that they can have certain different characteristics such as differences in molecular weight. Moreover, the encapsulating species can contain fillers, pigments, flame retardants, etc. providing that these do not alter the thermal coefficient of expansion by more than 25 percent.

The use of a premolded half-jacket in the specific example is intended to insure the existence of a minimum jacket wall around all sides of the encapsulated capacitor. If the half-jacket were not employed, it is possible that, as a result of the high pressure involved during the injection molding, the capacitor could be displaced to the far side of the die and the capacitor itself might have an extremely thin or no encapsulant about the far side of the capacitor. The encapsulating jacket should have a wall thickness of at least 8 mils, the upper limit being dictated by considerations of strength and economy.

While the specific example employs a premolded half-jacket in order to insure a minimum jacket wall, it is to be understood that other premolded spacer means can be employed for the same purpose. The spacer can be any premolded fractional jacket e.g. a ⅛ or ¾ jacket, designed to keep the capacitor section from being forced against the side of the die. The spacer means may also be a tube of the same polyolefin as the dielectric film of the capacitor section. Location of the secton within the tube during molding will insure a minimum jacket wall thickness. The polyolefin tube may have two or more inwardly extending appendages designed to roughly center the capacitor section within the tube.

It will also be understood that while the leads of the Example are welded to the extended foils of the capacitor section, any prior art technique for making contact may be employed. For example contact may be made by pressing hot leads against the ends of the section and permitting the fused polyolefin to cool and set about the lead head while the lead head is contacting the electrodes.

Since many widely different embodiments of the invention may be made without departing from the scope thereof, it is intended that all matter contained in the above description and shown in the accompanying drawing shall be interpreted as illustrative and not in a limiting sense.

We claim:

1. A thermoplastic jacketed thermoplastic capacitor comprising a convolutely wound capacitor section of electrodes separated by dielectric films, said electrodes being of a metal selected from aluminum, zinc, tin, lead and alloys thereof, said films being of a thermoplastic polyolefin selected from polyethylene, polypropylene and polybutylene, as least one of said films extending at least one complete turn around said section beyond the ends of said electrodes, the volume ratio of said films to said electrodes in said secton being at least 3 to 2, an encapsulating jacket of the same polyolefin as said films surrounding said section and thermally bonded thereto at least completely around the outermost turn of said films, said jacket being an integral composite of at least 8 mils thickness of a preformed spacing means and a mass of the same polyolefin, and leads in contact with said electrodes extending beyond said jacket.

2. The capacitor of claim 1 wherein said preformed spacing means is a preformed half shell which generally conforms to the configuration defined by one longitudinal half of said capacitor section.

3. The capacitor of claim 1 wherein said preformed spacing means is a preformed tube accommodating said capacitor section therewithin.

4. The capacitor of claim 3 wherein said tube has at least two inwardly extending appendages adapted to center said capacitor section within said tube.

5. The capacitor of claim 1 wherein said films are heat-shrunken biaxially oriented polypropylene films and said electrodes are aluminum foils.

6. The capacitor of claim 1 wherein said films have a thickness of from 0.1 to 1.0 mil and said electrodes are metal deposits of from 100 to 500 Angstroms selected from aluminum and zinc on said films.